(No Model.)
A. E. SPANGLER.
TARGET TRAP.
No. 344,504. Patented June 29, 1886.
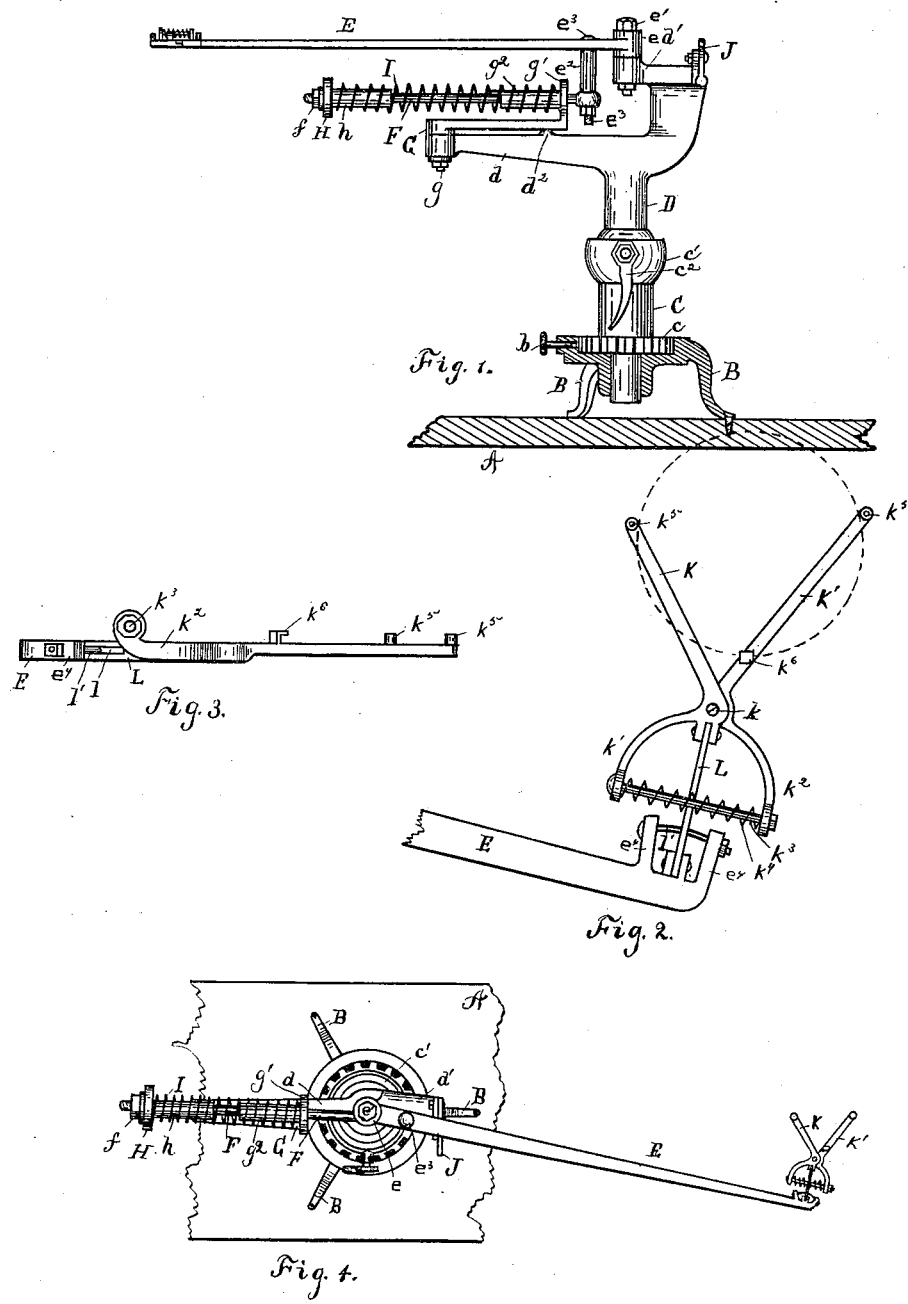
Witnesses
David S. Oliver
C. W. Miles
Inventor
Albert E. Spangler
By his Attorney
Geo. J. Murray

UNITED STATES PATENT OFFICE.

ALBERT E. SPANGLER, OF CINCINNATI, OHIO, ASSIGNOR TO THE CINCINNATI FLYING TARGET COMPANY, OF SAME PLACE.

TARGET-TRAP.

SPECIFICATION forming part of Letters Patent No. 344,504, dated June 29, 1886.

Application filed April 3, 1886. Serial No. 197,676. (No model.)

*To all whom it may concern:*

Be it known that I, ALBERT E. SPANGLER, a citizen of the United States, and a resident of Cincinnati, in the county of Hamilton and State of Ohio, have invented certain new and useful Improvements in Target-Traps, of which the following is a specification.

My invention relates to target-throwing traps for practicing marksmanship.

Its object is, first, a cheap compact device for impelling targets into the air; and, second, an improved target-holder which will hold any of the different patterns of targets and release them in the desired direction at the throwing-point without liability of fracturing them.

With these objects in view my invention consists in the peculiar arrangement and combination of parts, which will be first fully described in connection with the accompanying drawings, and then particularly referred to and pointed out in the claims.

Figure 1 is a side elevation of my improved target-trap, the throwing-arm being released and in its normal position when not in use. The base of the trap is shown in axial section, to expose the bearing of the trap-shaft and the wheel by which it is retained in any position in which it may be set around its axis, the shaft and wheel being shown in elevation. Fig. 2 is a plan view, upon an enlarged scale, of the target-holder and the end of the throwing-arm, to which it is secured. Fig. 3 is a side elevation of the holder, as seen in Fig. 2, looking at the end of the throwing-arm. Fig. 4 is a plan view of my trap, showing the throwing-arm locked in the position it occupies when the arm is thrown back and the spring compressed, preparatory to releasing the arm and impelling the target into the air.

A represents the customary wooden platform, upon which the trap is secured by screws passing through the legs B of its base. Fitted to revolve within the base is an upright shaft, C, which has a notched wheel, $c$, secured upon it to revolve within the base. The base has also a boss cast upon it to receive a setscrew, $b$, which passes through the boss and engages one of the notches in the wheel $c$. The object of this arrangement is to hold the shaft C in any position to which it may be turned around its axis.

On the upper part of the shaft C is a socket, $c'$, to receive a ball upon the lower end of the trap-shaft D. The socket $c'$, which is divided into two parts, in the usual manner, forming with the globular end of the shaft D a ball-and-socket joint, which permits the shaft D to be inclined at any desired angle, and held at any angle or in a vertical position, as shown, by the set-screw, operated by a handle, $c^2$, the screw clamping the two halves of the socket around the ball, the screw-bolt passing through a slot in the ball. The trap shaft D has a laterally-projecting arm, $d$, and also an overhanging bracket, $d'$, upon which the throwing-arm E and its tripping mechanism is mounted. The throwing-arm E has a perforated boss, $e$, through which a screw-bolt, $e'$, passes. The bolt, passing also through a boss in the overlapping bracket, is tightened down by a nut upon the under side. The arm E has also a downwardly-projecting boss or tube, $e^2$, cast with it, which is perforated to receive a steel screw-bolt, $e^3$, which passes through it and the arm and through the eye of the spring guide-rod F, the nut on the lower end of the screw $e^3$ keeping it in place.

G is a swinging arm or cradle pivoted on the outer end of the arm $d$ by the bolt $g$, which passes through it and the boss on the end of said arm. The cradle has an upwardly-projecting lug, $g'$, cast with it, and also, projecting parallel to the base of the cradle, has a boss or tube, $g^2$, which is perforated for the passage of the spring guide-rod F. This rod also passes through a collar, H, and a tube, $h$, which is cast with the collar. The end of the rod F is threaded to receive the nut $f$, which holds the collar H and tube $h$ in place against the pressure of the coiled spring I, which is compressed between the collar H and the upwardly-projecting lug $g'$ of the cradle G.

On the arm $d$ is a projection, $d^2$, upon which the base of the cradle G rests when the arm is drawn back, as in Fig. 4, to guide it and take the strain off from the bolt $g$. By drawing the arm E back until it engages the customary releasing-latch, J, the spring I is compressed, as seen in Fig. 4. The tubes $h$ and $g^2$ sustains the spring I and prevents it from buckling. It will be seen that when the latch J, Fig. 4, is pulled down by the tripping-cord in the usual manner the force of the spring will swing the arm around with great force past the center, when the recoil of the spring will stop it with a slight jerking motion, which will release the target which has been placed in the holder.

The target-holder consists of two hinged arms, K K', which are pivoted at $k$, each arm having a backward extension, $k'$ and $k^2$. The ends of these extensions curve upward and terminate in bosses, through which the bolt $k^3$ passes. A coiled spring, $k^4$, is compressed between these bosses around the rod $k^3$, and holds the target, which is shown in dotted line, Fig. 2, pinched between the opposite arms, K K', of the holder. Upon the end of each arm is an upwardly-projecting pin, to receive a short section of rubber tube, $k^5$, which bears against the edge of the target and holds it firmly in place, assisted by a hooked lug, $k^6$, which is arranged to pass over the edge of the target and hold it down on the arms until the rebound of the throwing-arm releases it.

The target-holder above described is secured to the end of the throwing-arm upon one side by a flat spring, L, which is secured between lugs upon the throwing-arm and upon the rear extension, $k'$, of the arm K. This flat spring L has a longitudinal slot, $l$, in it, as seen in Fig. 3, through which a rod, $l'$, passes, the rod being secured in lugs $e^4$, which project out from the arm E.

The operation of the device is as follows: The throwing-arm E being drawn back and locked in position shown in Fig. 4, the holder-arms K and K' are expanded by pressing upon the rear extensions, a target is placed in position and the force of the spring will hold it sufficiently secure to keep it in place until the arm reaches the throwing-point, when the latch J is thrown down and the arm E swings rapidly around with the target in it until it is past the center and slightly compresses the spring I. The arm E will then be thrown back with a slightly jerking motion, while the impetus given to the target-holder will impel it forward until its leaf-spring L strikes against the outward projection, $e^4$, on the throwing-arm. The slight jar thus caused releases the target and sends it in the air with a spinning motion, which insures its steady and rapid flight. The tension or force of the spring I is regulated by the nut $f$, outside of the collar H.

What I claim as new, and desire to secure by Letters Patent, is—

1. The combination of a target-trap having a spring-actuated throwing-arm, E, a target-holder consisting of the spring-pressed hinged arms K K' $k'$ $k^2$, and the spring-arm L, for securing the said holder to the end of the throwing-arm, substantially as shown and described.

2. In a target-trap, the combination, substantially as hereinbefore set forth, with the trap-shaft D, having arm $d$ and overhanging bracket $d'$, of the cradle G, pivoted in the end of arm $d$, the arm E, pivoted in the overhanging bracket $d'$, and the spring-actuated rod F, guided in said cradle, and connected to the throwing-arm as shown, whereby the arm is impelled around its axis.

3. The combination, substantially as specified, of the trap-shaft D, the arm $d$, projecting horizontally therefrom, bracket $d'$ overhanging the said shaft, with the arm E, pivoted on a bolt, $e$, in the overhanging bracket, the piece $e^2$, projecting downwardly from said arm E, the cradle G, having lugs $g$ $g'$ and pivoted to the end of said arm $d$, the rod F, passing through the lugs $g$ $g'$, bolt $e^3$, passing through the arm and piece $e^2$ and the eye in rod F, the spiral spring I, and the collar H $h$, for compressing the said spring between collar H and lug $g'$, for the purpose set forth.

4. The combination, substantially as specified, in a target trap, of the throwing-arm E, having lugs $e^4$ $e^4$, the slotted flat spring L, secured to said arm between the said lugs, a bowed guide-rod passing through the slot in the spring L and having its opposite ends secured to said lugs, and a target-holder, such as described, supported by the said spring, for the purpose set forth.

ALBERT E. SPANGLER.

Witnesses:
HENRY GARLICK,
GEO. J. MURRAY.